(12) United States Patent
Neugebauer

(10) Patent No.: US 12,725,305 B2
(45) Date of Patent: Sep. 1, 2026

(54) METHOD, COMPUTER PROGRAM, AND DEVICE FOR ALIGNING CAMERAS

(71) Applicant: ISRA VISION GMBH, Darmstadt (DE)

(72) Inventor: Peter Johannes Neugebauer, Griesheim (DE)

(73) Assignee: ISRA Vision GmbH, Darmstadt (DE)

( * ) Notice: Subject to any disclaimer, the term of this patent is extended or adjusted under 35 U.S.C. 154(b) by 25 days.

(21) Appl. No.: 18/866,166

(22) PCT Filed: May 11, 2023

(86) PCT No.: PCT/EP2023/062538
§ 371 (c)(1),
(2) Date: Nov. 15, 2024

(87) PCT Pub. No.: WO2023/222493
PCT Pub. Date: Nov. 23, 2023

(65) Prior Publication Data

US 2025/0322542 A1 Oct. 16, 2025

(30) Foreign Application Priority Data

May 19, 2022 (DE) ........................ 102022112625.0

(51) Int. Cl.
*G06T 7/73* (2017.01)

(52) U.S. Cl.
CPC ...... *G06T 7/75* (2017.01); *G06T 2207/10012* (2013.01); *G06T 2207/30168* (2013.01); *G06T 2207/30204* (2013.01)

(58) Field of Classification Search
CPC ............. G06T 7/75; G06T 2207/10012; G06T 2207/30168; G06T 2207/30204; G06T 7/13; G01B 11/2545
See application file for complete search history.

(56) References Cited

U.S. PATENT DOCUMENTS 9,485,470 B2 11/2016 Rentschler
11,640,673 B2 5/2023 Wirth et al.
(Continued)

FOREIGN PATENT DOCUMENTS

DE 102009035840 A1 2/2011
DE 102012109351 A1 8/2013
(Continued)

OTHER PUBLICATIONS

International Search Report for corresponding International Patent Application No. PCT/EP2023/062538 dated Aug. 2, 2023.

*Primary Examiner* — Mekonnen D Dagnew
(74) *Attorney, Agent, or Firm* — Greer, Burns & Crain, Ltd.

(57) ABSTRACT

A method for aligning a specified number of real cameras in order to measure a real three-dimensional object and to a corresponding device. The device has cameras and a pattern in a specified coordinate system, wherein in order to carry out the measurement, the pattern is projected onto the surface of the real object with a projector, and the pattern is at least partly captured by each real camera of the specified number of real cameras. Additionally, a three-dimensional virtual model of an ideal object which corresponds to the real object is provided. Instructions and/or control information for aligning each camera is ascertained using a plurality of target markings on the surface of the ideal object in the three-dimensional virtual model, and the instructions and/or control information are provided on a specified interface.

15 Claims, 3 Drawing Sheets

(56) References Cited

U.S. PATENT DOCUMENTS

2010/0329538 A1 12/2010 Remillard
2013/0162852 A1* 6/2013 Boyle ................ H04N 23/6812 348/211.99
2014/0112573 A1 4/2014 Francis, Jr. et al.
2017/0026636 A1 1/2017 Zahn et al.
2017/0039756 A1* 2/2017 Moule ..................... G06T 7/521
2021/0044738 A1* 2/2021 Shikata ..................... G06T 7/80

FOREIGN PATENT DOCUMENTS

DE 102018108874 A1 10/2019
DE 102018109586 A1 10/2019
DE 102019110729 A1 10/2020

* cited by examiner

7'
23'
12'
25
25

12'

METHOD, COMPUTER PROGRAM, AND DEVICE FOR ALIGNING CAMERAS

CROSS-REFERENCES TO RELATED APPLICATIONS

This application is a national phase of International Patent Application No. PCT/EP2023/062538, filed on May 11, 2023, which claims the benefit of German Patent Application No. 10 2022 112 625.0 filed on May 19, 2022, the entire disclosures of which are incorporated herein by way of reference.

FIELD OF THE INVENTION

The invention relates to a method and a device for orientating a predetermined number of real cameras for measuring a real three-dimensional object using the cameras and a pattern in a three-dimensional coordinate system.

BACKGROUND OF THE INVENTION

The method of stereoscopy, in which a pattern is projected onto the object surface by means of a projector and the pattern projected onto the object surface is recorded using at least two cameras, is frequently used for non-contact measuring of, in particular, three-dimensional objects in a three-dimensional coordinate system. Such a method is known, for example, from the document DE 10 2018 108 874 A1. The known method uses cameras that are intrinsically and extrinsically calibrated. In order to achieve more robust and less interference-prone measuring, a two-dimensional coding and a temporal coding are generated during pattern projection by using a (completely) two-dimensionally coded pattern and recording the pattern projected onto the object surface using the cameras. Furthermore, a temporally coded pattern with different two-dimensional coding is projected several times in succession and several recordings of the pattern projected onto the surface are generated one after the other using the cameras, each triggered at the same time.

The known method is well suited for an object that is measured in large quantities or in a similar form and under constant conditions. If a large number of different objects are measured at a measuring site, the above method is quite complex due to the calibration.

If different objects are measured at a measuring site using a large number of cameras, the arrangement and orientation of the cameras must also be changed and adapted to the respective measuring task. With a large number of cameras, setting up and calibrating the measuring site, in particular the orientation of the large number of cameras, is very time-consuming.

An evaluation unit for processing images and/or image sequences of measurement areas that can be detected on a crash vehicle is known from the document DE 10 2012 109 351 A1. Orientation cameras that are permanently mounted on the measuring cameras may be used for the orientation of the measuring cameras. Alternatively or additionally, at least three reference markers arranged in the measuring area may be recorded. The document DE 10 2009 035 840 A1 discloses a method for positioning and/or adjusting high-speed cameras for crash tests on motor vehicles, in which positions, angular positions and/or focal lengths of the high-speed cameras are calculated by means of photogrammetric orientation data from a database or a CAD system and are reproducibly positioned and/or adjusted by photogrammetric means. Finally, document US 2017/0026636 A1 describes a method for the spatially accurate projection of a marking on an object, in which a 2-dimensional or 3-dimensional model of the object is used.

SUMMARY OF THE INVENTION

An object of the present invention is therefore to specify a method or to create a device which enables simple and time-saving orientation of the cameras for accurate measuring of objects of any shape and size.

The above object may be solved by a method having the features of one or more embodiments described herein, a computer program having the features of one or more embodiments described herein, a device having the features of one or more embodiments described herein and a system having the features of one or more embodiments described herein.

In particular, the object may be solved by a method for establishing the orientation of a predetermined number of real cameras for measuring a real three-dimensional object using the cameras and a pattern in a predetermined coordinate system, wherein for said measurement said pattern is projected onto the surface of the real object by means of at least one projector and said pattern is recorded at least sectionwise with each real camera of said predetermined number, wherein a three-dimensional virtual model of the ideal object corresponding to the real object exists, comprising the following steps:

a) adjusting the at least one projector on the surface of the real object such that the position of the pattern on the surface of the real object corresponds to a predetermined position of the pattern on the virtual model,
b) definition or provision a plurality of target marks on the surface of the ideal object in the three-dimensional virtual model, which corresponds to the surface of the real object to be measured,
c) automatically determining a reference information for each camera, wherein the reference information comprises an identification information which includes the information which at least one target mark of the plurality of target marks captures the respective camera when the respective camera and the projector of the pattern are arranged and oriented in a predetermined manner, and the reference information further comprises a location information associated with the respective camera and target mark, which includes the information where in a captured image of the field of view of the respective camera said at least one target mark appears when the respective camera and the at least one projector of the pattern are arranged and oriented in the predetermined manner, wherein the determination of the reference information for each camera is performed based on the three-dimensional virtual model of the ideal object and corresponding virtual representations of the cameras and the pattern, and
d) recording an image of the surface of a real object with a real camera, automatically calculating indications and/or control information for finding the specified target marks in the image of the respective real camera and for orienting the respective real camera using the real object based on the determined reference information for the respective camera, and providing the indications and/or control information for the respective camera at a predetermined interface, wherein step d) is performed for each camera of the predetermined number of cameras.

As already explained above, the method described above is used to set up a measuring site for measuring a real three-dimensional object, e.g. a chassis, a housing part, a battery module, a windscreen or the like, in particular to orientate the cameras of the measuring site. If such a measuring site is used for very different objects with different shapes and dimensions and a large number of cameras, such a setup using the above orientation procedure is simplified and may be performed in a shorter time period. The automatic generation of reference information and indications and/or control information for the orientation, which is described in more detail below, enables effective display and automatic assistance or implementation of the orientation, for example on a screen/monitor, so that the time required for setting up the measuring site and thus for the entire measurement is also automatically reduced.

The method described above may be realized as a computer-implemented method, i.e. as a method carried out using a computing unit (computer), in particular in the steps of automatically determining the reference information and automatically calculating indications and/or control information for finding the target marks for each real camera and aligning the real cameras. The determination of a plurality of target marks on the surface of the ideal object may also be automatic or semi-automatic, i.e. partially automatic and partially manual, or completely manual. In the case of manual determination, the computer-implemented method may be configured to interactively request the (manual) determination of the plurality of target marks on the surface of the ideal object, for example by input in a corresponding, predetermined interface, and to store the entered target marks in a memory unit. In a semi-automatic or automatic determination of the target marks based on the three-dimensional virtual model of the object, the target marks may be selected in such a way that a predetermined number of target marks are arranged in the field of view of each camera (when the camera is oriented) distributed over the entire image of the respective camera.

The measuring of the three-dimensional object by the predetermined number of cameras, which captures the surface facing the respective cameras, following the orientation of the cameras and any necessary intrinsic and/or extrinsic calibration of the cameras, may be carried out using the stereoscopy method already described above, for example. The pattern required for this, which is projected onto the surface of the object, may be generated using one or more projectors.

The specified coordinate system is, for example, a Cartesian coordinate system; in one embodiment, the coordinate system used may be the coordinate system of the object. The coordinate system is used as a global coordinate system, wherein corresponding transformation matrices are provided to convert the camera coordinates and/or the pattern coordinates into the predetermined coordinate system.

The three-dimensional virtual model is a virtual model of the ideal object that corresponds to the real object to be measured, e.g. a CAD model of the ideal object. Usually, a large number of real objects are measured, all of which essentially correspond to the ideal object and each comprise minor or major deviations from the ideal object, for example due to production and/or material. The model of the ideal object is stored, for example, in a memory unit connected to the computing unit and may be retrieved from there.

According to the invention, the three-dimensional virtual model of the ideal object is known and a plurality of target marks on the surface of the ideal object are identified in this model. These target marks are virtual marks and constitute, for example, distinctive points on the surface of the ideal object, such as holes, edges, protrusions and the like, or are arranged in the area of these points, which are contrasted to their surroundings in the camera image and are therefore easily recognizable, for example by their shape. For example, each target mark is a small section of the surface of the three-dimensional model, for example comprising several points/pixels of the model. The object surface section in the virtual model may comprise the pattern present in this section on the surface of the virtual model and projected onto the surface. As an alternative to two-dimensional coding, the target mark may comprise a unique temporal coding in one or more pixels of the virtual model if a time-varying pattern is projected onto it. It is highly advantageous to orientate the target marks to the three-dimensional virtual model of the ideal object and to the projected pattern to enable faster orientation. The target marks are set at a predetermined density or distance on the surface of the ideal object, wherein in one embodiment the target marks are set individually and separately for each virtual model/object.

Using the three-dimensional virtual model of the ideal object and corresponding virtual representations of the cameras and the pattern, reference information is determined for each camera of the predetermined number of cameras, wherein the reference information comprises identification information and location information. The reference information is calculated on the basis of the three-dimensional virtual model of the ideal object and the target marks defined on it. Furthermore, the location of the respective camera in the specified coordinate system, i.e. its position in the three-dimensional coordinate system, and the direction in which the respective optical axis is oriented is defined for each camera and thus known prior to the calculation of the reference information. This known data is referred to as the representation of the respective camera. Furthermore, it is defined and thus known where the at least projector projecting the pattern is located and in which direction it projects the pattern, i.e. in which direction it is oriented. This data is referred to as the representation of the pattern. The pattern may be generated with a single projector, two projectors or a plurality of projectors, wherein the respective representation is of course known for each projector if several projectors are used. From this known data, the reference information is calculated purely by modelling/virtually in the method, wherein the determined reference information of a camera serves as a reference for the orientation of the respective real camera, as described in more detail below. In one embodiment, known methods of photogrammetry (e.g. close-range photogrammetry) may be used to calculate the reference information.

The identification information forming a component of the reference information comprises, separately for each camera, the information as to which at least one target mark of the plurality of target marks is captured by the respective camera, i.e. which at least one target mark appears in the image generated by the respective camera. For example, the target marks may be numbered and the numbers of the target mark(s) that are seen by the respective camera may be determined. These may be, for example, 1 to 4 target marks that are distributed across the image of the respective camera.

The location Information forming a further component of the reference information are data containing the information as to where this at least one target mark appears in a virtually calculated (virtually captured) image of the field of view of the respective (virtual) camera when the respective camera and the projector of the pattern are arranged and oriented in the specified manner. This location information may comprise, for example, the three- or two-dimensional position/location coordinates in a coordinate system associated with the respective camera or in a two-dimensional image coordinate system that (virtually) captures the respective camera.

In the method, the orientation of the real cameras is carried out after the reference information has been determined. For this purpose, the cameras are first arranged at the specified positions in the specified coordinate system. In addition, the projector(s) for the pattern is/are also arranged and oriented at the specified positions in the specified coordinate system beforehand. Now the image of the surface of a real object corresponding to the three-dimensional virtual model recorded by the respective camera is recorded by each real camera and compared in an analysis with the reference information, i.e. with the identification information and location information(s) associated with the respective camera. Therein, when the image is captured, the pattern generated by the projector(s) is projected onto the surface of the real object. As a result of the comparison, indications and/or control information for finding the defined target marks in the image of the respective real camera and for the orientation of the respective real camera are calculated. These indications and/or control information are calculated separately for each real camera and then provided at a predetermined interface, i.e. at an interface of the computing unit. Based on the indications and/or control information, a user and/or a corresponding automatic adjustment device may orientate each real camera when transmitted to the automatic adjustment device or displayed to a user, for example on a screen.

In an embodiment, the calculation of indications and/or control information may be performed multiple times for each real camera, so that the orientation is performed in multiple steps, which increases the accuracy of the orientation. Accordingly, the comparison of the image captured by the respective camera with the reference information is carried out several times. For example, after a first calculation and provision of the indications and/or control information for the orientation, a rough orientation of all cameras may be performed and subsequently, after a second calculation and provision of the indications and/or control information, a fine adjustment may be performed.

In one embodiment, the cameras or a proportion of the predetermined number of cameras are/is at least approximately intrinsically calibrated. This may result in greater accuracy in the orientation of the cameras and where applicable of the projector(s).

In one embodiment, the at least one target mark on the surface of the real object may be searched for in the image of the respective camera in accordance with the identification information in order to determine the indications and/or control information for orientation, if necessary using a real pattern projected onto the surface of the real object. Depending on the target mark(s) found in the image of the respective camera, the indications and/or control information for finding the at least one target mark are subsequently calculated, i.e. whether the camera must be rotated to the left/right/up/down or not moved, so that the target mark(s) desired/specified according to the identification information in the image of the respective camera appears in the image of the camera after the corresponding orientation. The indications and/or control information calculated on the basis of the identification information may accordingly include direction and/or length information describing in which direction and/or by what amount the respective camera is to be oriented (e.g. is to be swiveled).

In one embodiment, indications and/or control information for the orientation of the respective real camera are determined by comparing the identification information and the at least one target mark visible in the image of the respective real camera and/or by comparing the determined location information of the at least one target mark for the respective camera with the position of the at least one target mark in the image of the respective real camera. For example, the location information may contain the information that a target mark is arranged on the optical axis of the camera. When comparing the real image of the camera with the location information, it is determined how far the point of impact of the optical axis is from the target mark in the recorded image of the real camera and in which direction the target mark is located from the point of impact of the optical axis. Accordingly, indications and/or control information are calculated in order to move the camera in such a way that, after orientation, the target mark is at or as close as possible to the point of impact of the optical axis in the image of the real camera. The indications and/or control information calculated from the location information may accordingly include direction and/or angle (size) information describing in which direction and/or by which angle (size) the respective camera is to be oriented (e.g. is to be swiveled).

In one embodiment, a quality measure for the deviation of the current orientation of the respective real camera from the reference information determined for the respective camera is determined and made available as indications and/or control information at the predetermined interface. In one embodiment, a quality measure that is small in terms of absolute value or real amount indicates that the alignment is already very good, while a quality measure that is large in terms of absolute value or real amount indicates that the orientation of the respective camera (or a predetermined group of cameras of the plurality of cameras) is still inadequate. The quality measure may, for example, be calculated as the sum over all targets of the respective camera of the square of the distance (alternatively: the absolute value of the distance) of each target in the image of the real camera from the determined location information of the respective target.

In one embodiment, the pattern projected onto the surface is a fully two-dimensional coded pattern, wherein a fully two-dimensional coded pattern is understood to mean that the pattern is coded at least in the entire projection area of interest, which is the section of the pattern shown on the object (or more precisely the surface of the object) by the projection. In principle, a pattern that realizes two-dimensional coding is projected in the case of two-dimensional coding, which means that a pattern point can be clearly identified in the context of the overall pattern or of at least a certain pattern environment around this pattern point. Two-dimensional pseudo-random patterns whose resolution is selected such that the cameras may just reliably resolve the individual pattern points, i.e. the resolution of the camera's pixels is higher than the individual pattern points, have proven to be particularly advantageous here. In other words, the pixels of the camera on which the pattern is imaged are smaller than the pattern points of the pattern imaged in the pixels of the camera. A pattern point is therefore described by several pixels of the camera or the camera image, preferably located adjacently in two dimensions. How high the resolution of the pattern points must be so that the image processing system may reliably locate (i.e. resolve) the individual pattern points depends on the respective optical conditions and may be determined and set accordingly by the person skilled in the art when setting up the system by means of theoretical considerations and/or experiments. Depending on the application, it is generally possible for a pattern point to be imaged in just one camera pixel. However, it will often make sense for a pattern point to comprise a two-dimensional arrangement of several camera pixels.

In one embodiment, the pattern may be the fully two-dimensional or temporally encoded pattern described above or any other two-dimensional pattern. For the projection of such a pattern, a digital micromirror device (DMD) or another digital light processing projector (DLP projector) or a simple (conventional) slide projector may be used, which projects a pattern (physically) present on a transparent carrier (slide), wherein different brightnesses are generated by appropriate control of the projection lamps and/or by filters of different densities, e.g. grey filters, wherein different brightnesses are generated by appropriate control of the projection lamps and/or by filters of different densities, e.g. grey filters. These are superimposed on the transparent carrier of the pattern (pattern carrier) in the projection. Such a slide projector may also be used for spatial displacement of a two-dimensional pattern. In this case, it is sufficient to (minimally) spatially displace and/or tilt the slide carrier of the otherwise fixed slide projector (including its spatially fixed projection optics), which is provided with the slide carrying the pattern. The movement is then displayed on the surface of the object according to the projection optics. The advantage of such slide projectors, which may be used to carry out the method described here, is that they are inexpensive, robust and technically easy to handle. They are therefore particularly suitable for industrial environments. When using a digital projector, any desired pattern that can be shown on a display may be projected. In addition to two-dimensional (structured) patterns, they may also project a brightness distribution-which in itself has no structure-onto the object. This may be realized comparatively easily using digital projectors. Alternative grey value gradients (or more generally: brightness gradients) may also be used.

Procedures and methods of artificial intelligence (computer vision), fuzzy logic and/or the like means may be used to determine the reference information for each camera and/or to calculate the indications and/or control information.

In one embodiment, the interface is connected to a display device, e.g. a screen or mixed reality glasses or the like, and/or a loudspeaker and/or a control device for a plurality of motors, wherein the indications and/or control information are processed by the display device and/or the loudspeaker and/or the control device and/or are output on the display device and/or the loudspeaker and/or are transmitted by the control device to the motors such that the real cameras are automatically oriented according to the determined reference information of the cameras. The indications and/or control information may, for example, be displayed and/or output as arrows and/or corresponding information text. Alternatively or additionally, the image of the real camera and an image of the camera embodying the reference information may be displayed one above the other on a screen, e.g. with different brightnesses. The embodiment of the reference information may, for example, display the at least one target mark of the respective camera in an image such that a marker, e.g. a circle and/or a crosshair, is arranged exactly at the position where the target mark is to appear according to the location information. Accordingly, the user may very easily determine whether there is a match between the image of the real camera and a camera image representing the reference information.

In one embodiment, if at least two target marks are provided for an orientation for a camera, the target marks may be connected to each other and, if necessary, the connecting line may be included as a further target mark in the determination of the reference information and/or the calculation and provision of the indications and/or control information. Accordingly, the target marks may have any two-dimensional shape, for example a point or line shape, wherein target marks with different shapes may be combined for one camera. A line-shaped target mark may facilitate the orientation of the user, for example when using the indications and/or control information on a screen.

In an embodiment, at least one auxiliary camera may additionally be provided for performing the method, which is used for the orientation of the at least one projector in step a) on the real object. Generally, during the orientation of the projector, an operator or at least one camera, for example the above-mentioned at least one auxiliary camera, observes the scene, in particular the position of the pattern in relation to the real object. The position of the pattern is then compared with the position of the same pattern in relation to the virtual model (manually by an operator or automatically by means of the computing unit) and it is determined whether the position of the pattern in relation to the real object corresponds to the predetermined position of the pattern on the virtual model. Based on the result of the comparison, the orientation of the at least one projector is changed. This means that the projector is oriented differently in order to adjust the position of the pattern in relation to the real object so that it corresponds to the predetermined position of the pattern in relation to the virtual model. Here, the pattern may be oriented by means of marked and visible points on the surface of the real object (e.g. edges, holes and similar structures). As an alternative to the at least one auxiliary camera, at least one of the cameras may be used for the orientation of the at least one projector, which is then used for measuring the real three-dimensional object and is oriented for this purpose (after the orientation of the at least one projector and before measuring).

Since at least two images of an image point are required for measuring methods such as stereoscopy, it is proposed according to one embodiment to record a pattern section or a section of the object surface from different viewing angles using at least three cameras, preferably four cameras, for measuring the real object subsequently following the orientation and calibration of the cameras. Accordingly, the cameras are also oriented to the same or similar sections of the object surface. This creates redundant image recordings during measuring, which increases the robustness of the measuring process.

By using at least three, preferably four, or possibly even more cameras for a pattern or object surface section, the problem that exists in practice with stereoscopic measurement, namely that the system reacts very sensitively to defects in the calibration, may be solved. To be able to carry out a stereoscopic measurement, the cameras involved must be calibrated both intrinsically and extrinsically (as accurately as possible). Here, a rough intrinsic calibration of the cameras may be performed before the orientation of the cameras and the intrinsic fine calibration may be performed after the orientation of the cameras according to the above procedure. Alternatively, the intrinsic and extrinsic calibration of the cameras may be carried out according to known photogrammetry methods. In particular, the automatically, semi-automatically or manually (interactively) defined target marks may be used as new correspondences in the bundle block adjustment calculation of photogrammetry. This optimizes the calibration of the system on the surface of the real object to be measured, as many control points are included in the adjustment calculation in addition to the photogrammetric markers and scales.

Intrinsic calibration comprises the determination of all parameters that describe the camera itself regardless of its position, e.g. focal length, optical distortions, principal point shift, etc. Many different methods are known in the literature as to how such a calibration may be carried out.

In extrinsic calibration, the position of the camera is determined in relation to the specified reference coordinate system. In this case, this may be the coordinate system of the object. Again, there are several methods described in the literature.

According to an embodiment of the proposed device, at least ten cameras are provided and arranged in such a way that a section of the object surface or the pattern is recorded from at least four different angles, wherein—as already described and for both the proposed system and the proposed method—all cameras are extrinsically and intrinsically calibrated.

According to an embodiment of the device, the device comprises a computing unit (computer with a corresponding processor) configured to perform the above-described method or stages thereof (see also above explanations on the analogue computer-implemented method). In particular, the computing unit is provided to perform the steps of determining the reference information and calculating the indications and/or control information and providing them at the predetermined interface. As already described above, the step of determining the target marks may also be carried out by means of the computing unit. Please refer to the explanation of the method above. The person skilled in the art will incorporate the described device features into the proposed system according to the invention as required, either together or in proportion to the function described.

The computing unit, also referred to as a controller, control device or control unit, may include a processing unit and a memory (also referred to as a storage unit) in which computer-executable instructions for performing the methods described herein are stored. The processing unit or other units described may comprise any suitable devices configured to cause a series of steps to be performed to implement the method such that instructions, when executed by the computing device or other programmable device, may cause the functions/actions/steps specified in the methods described herein to be performed. The processing unit or other unit may comprise, for example, any type of general purpose microprocessor or microcontroller, a digital signal processor (DSP), a central processing unit (CPU), an integrated circuit, a field programmable gate array (FPGA), a reconfigurable processor, other suitably programmed or programmable logic circuitry, or any combination thereof. The memory may be any suitable known or other machine-readable storage medium. The memory (data carrier) may be a non-volatile, computer-readable storage medium, such as an electronic, magnetic, optical, electromagnetic, infrared or semiconductor system, or any suitable combination of the foregoing. The memory may comprise any suitable combination of any type of computer memory located either inside or outside the device or computing unit, such as random access memory (RAM), read only memory (ROM), compact disc read only memory (CDROM), electro-optical memory, magneto-optical memory, erasable programmable read only memory (EPROM) and electrically erasable programmable read only memory (EEPROM), ferroelectric RAM (FRAM) or the like. The memory may comprise any storage means (e.g., devices) suitable for retrievably storing the computer program executable by the processing unit. The methods described herein may be implemented in a high-level procedural or object-oriented language or a scripting language, or a combination thereof, to communicate with or support operation of the control device or processing unit. Alternatively, the procedures described herein may be implemented in assembly language or machine language. The language may be a compiled or interpreted language. The program code for implementing the methods described herein may be stored on the storage medium or in the device, for example on a ROM, a magnetic disc, an optical disc, a flash drive or any other suitable storage medium. The program code may be read by a general or specialized programmable computing device to configure and operate the computer when the storage medium or device is read by the computer to perform the methods described herein. Computer-executable instructions (computer program) may take many forms, including program modules that are executed by one or more computers or other devices. Program modules generally include routines, programs, objects, components, data structures, etc. that perform specific objects or implement specific abstract data types. Typically, the functionality of the program modules may be combined or distributed in different embodiments as desired.

Accordingly, the above object may be solved by a computer program with program code, which is stored on a machine-readable data carrier, for carrying out the method steps according to the above method when the computer program is read by a computing unit (computer) and executed on a computing unit (computer).

The above object may furthermore be solved in particular by a device providing the orientation of a predetermined number of real cameras for measuring a real three-dimensional object using the cameras and a pattern in a predetermined coordinate system, wherein the pattern is projectable onto the surface of the real object by means of at least one projector and is recordable with each real camera at least sectionwise, wherein a three-dimensional virtual model of an ideal object corresponding to the real object is present, wherein A) the at least one projector is adjustable on the surface of the real object in such a way that the position of the pattern corresponds to a predetermined position of the pattern on the virtual model, wherein the device comprises a computing unit configured to B) define or provide a plurality of target marks on the surface of the ideal object in the three-dimensional virtual model corresponding to the surface of the real object to be measured, C) automatically determining a reference information for each camera, wherein the reference information comprises an identification information which includes the information as to which at least one target mark of the plurality of target marks the respective camera captures when the respective camera and the projector of the pattern are arranged and oriented in a predetermined manner, and the reference information further comprises a location information associated with the respective camera and target mark, which includes the information where in a captured image of the field of view of the respective camera this at least one target mark appears when the respective camera and the at least one projector of the pattern are arranged and oriented in the predetermined manner, wherein the determination of the reference information for each camera is based on the three-dimensional virtual model of the ideal object and corresponding virtual representations of the cameras and the pattern, and D) recording an image of the surface of a real object with a real camera, automatically determining indications and/or control information for finding the specified target marks in the image of the respective real camera and for orienting the respective real camera using a real object based on the determined reference information for the respective camera, and automatically providing the indications and/or control information at a predetermined interface, wherein the computing unit is configured to perform step D) for each camera of the predetermined number of cameras, wherein, in one embodiment, the data of the three-dimensional virtual model of the ideal object are CAD data and/or the pattern is a two-dimensional coded pattern.

In one embodiment, the computing unit is configured to search for the at least one target mark on the surface of the real object with each real camera and the real object using a real pattern projected onto the surface of the real object according to the identification information in the recorded image of the respective camera and subsequently calculate the indications and/or control information for finding the at least one target mark.

In one embodiment, the computing unit is configured to determine indications and/or control information for orienting the respective real camera by comparing the identification information and the at least one target mark visible in the image of the respective real camera and/or by comparing the determined location information of the at least one target mark for the respective camera with the position of the at least one target mark in the image of the respective real camera.

In one embodiment, the computing unit is configured to determine a quality measure for the deviation of the current orientation of the respective real camera from the reference information determined for the respective camera and to make it available as indications and/or control information at the predetermined interface.

In one embodiment of the device, the device comprises at least one auxiliary camera which, as described above, may be used for the orientation of the at least one projector.

In one embodiment, the interface of the device is configured to be connectable to a display device, e.g. a screen, and/or a loudspeaker and/or a control device for a plurality of motors, wherein the indications and/or control information are transmitted to the display device and/or to the loudspeaker and/or to the control device.

The above object may further be solved by a system comprising a device described above and a display device, e.g. a screen, and/or a loudspeaker and/or a control device for a plurality of motors, wherein the interface is connected to the display device and/or the loudspeaker and/or the control device and the indications and/or control information provided at the interface can be transmitted to the display device, the loudspeaker and/or the control device, wherein the indications and/or control information are processed by the display device and/or by the loudspeaker and/or by the control device and/or the indications are output on the display device and/or the loudspeaker and/or the control information is transmitted by the control device to the motors in such a way that the real cameras are automatically oriented according to the determined reference information of the cameras. For example, each camera may comprise a servomotor/actuator which, according to the control information transmitted to it, orients the camera accordingly using the target marks.

BRIEF DESCRIPTION OF THE DRAWINGS

Further advantages, features and possible applications of the invention are described below with reference to a preferred embodiment and the drawings. All the features described and/or illustrated form the subject-matter of the present invention, even independently of their grouping in the claims and their references.

It is shown schematically in.

DETAILED DESCRIPTION OF THE PREFERRED EMBODIMENTS

Figure 1:
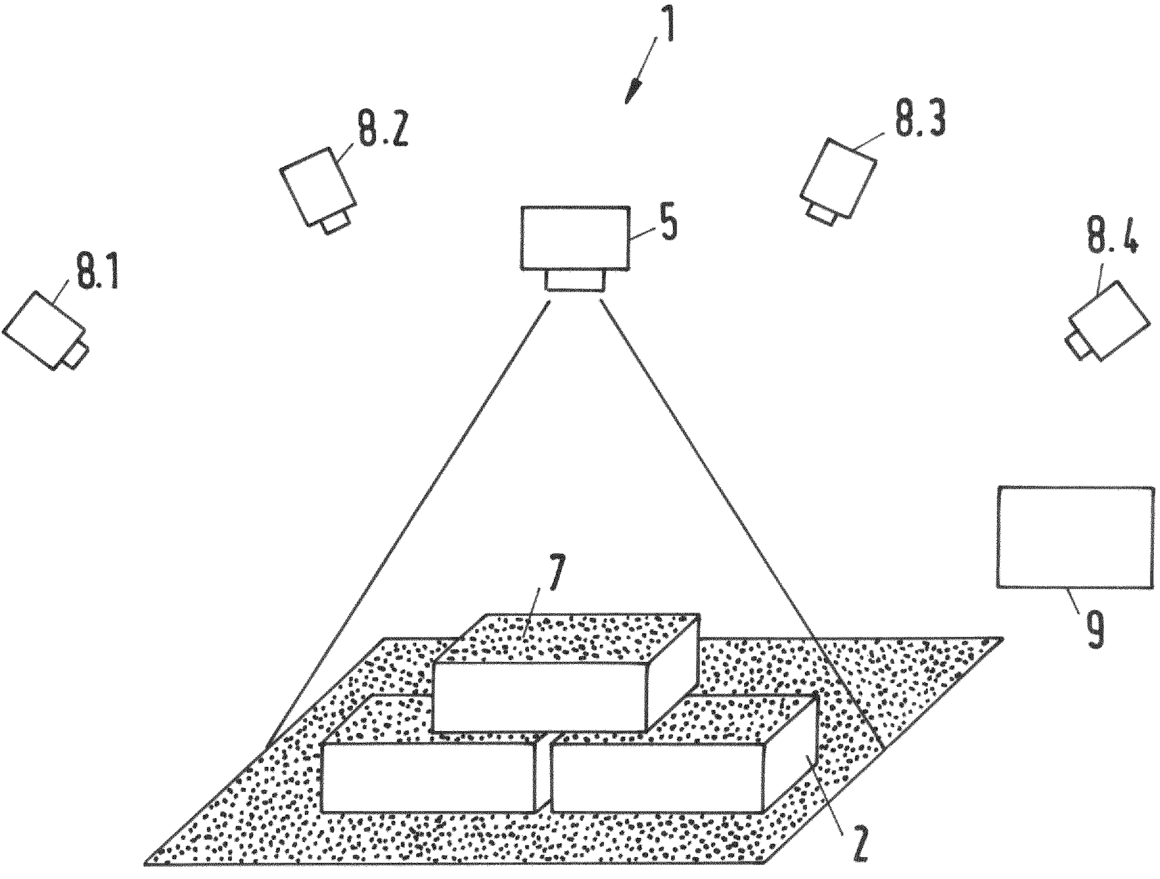
FIG. 1 an example of a stereoscopic measurement in a perspective view from the side, FIG. 2 a system according to the invention in a perspective view from the side, FIG. 3 CAD model of the ideal object for the system according to FIG. 2 in a view from the front, and FIG. 4 a section of the view of FIG. 3.

FIG. 1 shows an example of a system 1 for measuring a three-dimensional object 2 using stereoscopy in a schematic representation. In FIG. 1, the three-dimensional object is shown for the sake of clarity as three cuboid stones lying on top of each other; however, the invention expressly relates to any three-dimensional objects 2, which also include such objects.

The system 1 comprises a projector 5 for projecting an (area and/or time) coded pattern 7 onto the surface of the object 2. In the system 1 according to a particularly preferred embodiment, four cameras 8.1, 8.2, 8.3 and 8.4 are provided for recording the pattern 7 (referred to as the scene) projected onto the object surface. The projector 5 may be a conventional slide projector or a digital projector, in which the pattern 7 to be projected can be generated on a transparent display according to a digital template.

Furthermore, a computing unit 9 connected to the projector 5 and the cameras 8.1, 8.2, 8.3 and 8.4 is provided, which is configured to perform a measurement of the object 2 by means of stereoscopy using the pattern 7, which may be a fully area-coded pattern (e.g. a pseudo-random pattern). Such measuring is described, for example, in the document DE 10 2018 108 874 A1.

Figure 2:
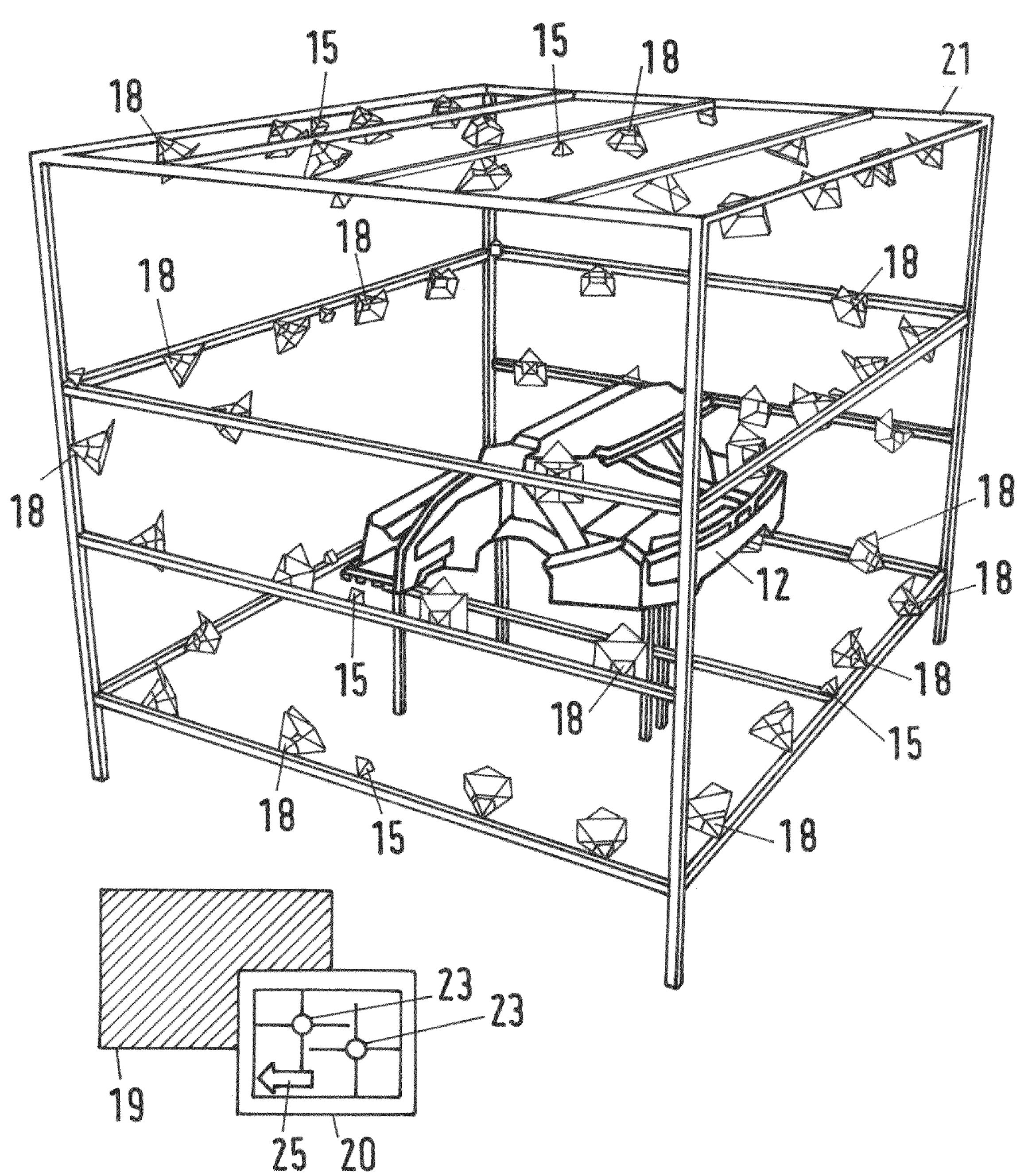

FIG. 2 shows an embodiment of a measuring cell for the stereoscopic measuring of a vehicle body part 12 as an example of the use of fifty cameras 18 and fifteen projectors 15, which are arranged on a scaffold or frame 21 surrounding the measuring cell. Both the cameras 18 and the projectors 15 are attached to the frame 21 at predetermined locations and are roughly oriented. In order to orientate the projectors 15 and the cameras 18 before measuring the body 12, a CAD model of the body part 12 is available in a memory unit of a computing unit 19 connected to the cameras 18 and the projectors 15. The orientation of the projectors 15 takes place before the orientation of the cameras 18 by orienting the pattern imaged on the surface of the body part 12 by the projectors. The orientation of the defined pattern on the CAD model is used as a comparison and the orientation of the projectors 15 is changed until the pattern extends on the surface of the body part 12 in such a way that it matches the (virtual) position of the pattern on the CAD model.

Furthermore, the CAD model of the body part 12 is used to automatically, semi-automatically or interactively determine a plurality of target marks 23 as described above in such a way that at least one target mark per camera, preferably two or three target marks distributed on the camera image, may be perceived. Each target mark is given a unique identifier, for example a unique number. These target marks 23 may either be provided and stored in the memory unit or entered by the user or determined automatically or semi-automatically by the method. Based on this CAD model, the defined or provided target marks 23 and the known locations of the projectors 15 and the cameras 18 on the frame 21, the computing unit 19 uses known photogrammetry algorithms to calculate reference information for each camera, which contains, as identification information, information about which target mark(s) 23 of the plurality of target marks are perceived in the image of an ideally oriented camera 18. The identification information comprises, for example, the numbers of the target mark(s) 23 that are completely perceived by the respective camera in the ideal orientation. In addition, location information (e.g. pixel coordinates of the respective target mark) is calculated for each camera 18 and each target mark that is captured by this camera 18, which indicates where in the image of this camera 18 the respective target mark will appear in an ideal orientation. This location information may, for example, be calculated in the coordinate system of the respective camera. If several target marks 23 are present in a camera image, these may also be connected with a line and this line used as a further line.

Once the reference information has been determined for each of the predetermined number of cameras, i.e. for all fifty cameras 18, it may be stored in the memory unit of the computing unit 19.

Figures 3, 4:
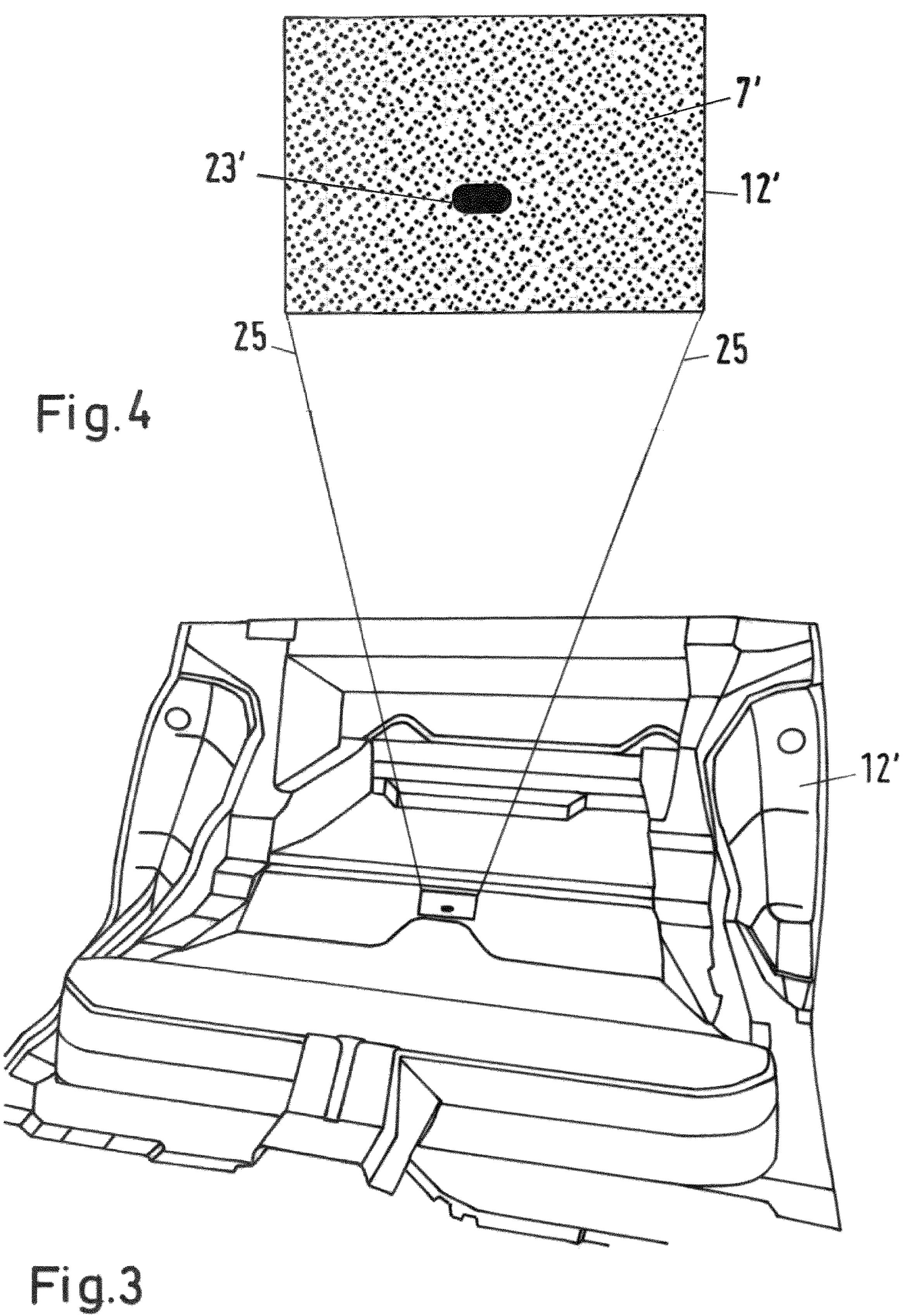

A target mark for a CAD model 12' of the vehicle body part 12 shown in FIG. 4 is visible in more detail in FIG. 3. The target mark is formed by an approximately elliptical opening 23' of the CAD model 12', which stands out from the surroundings in the image due to a dark contrast. The two obliquely extended lines indicate the area of the CAD model 12' in which the opening 23' is located. Alternatively and additionally, further openings, edges, elevations or indentations of the CAD model 12' may form target marks.

The orientation of the cameras 18 is carried out for each camera with respect to a real object 12 in the form of a real motor vehicle body part 12, which is arranged in a provided position in the measuring cell with the framework 21. For each camera 18, an image of the vehicle body part 12 is recorded and forwarded to the computing unit 19 and compared in the computing unit 19 with the determined reference information. For this purpose, cross-correlation algorithms are used, for example, to search for the defined target marks in the recorded image of the respective camera 18 and to determine whether the target marks determined according to the identification information are already visible in the image of the respective camera 18 or not. Accordingly, the computing unit 19 determines indications and/or control information indicating in which direction and/or over which angle (absolute value) the camera must be swiveled based on the identification information, so that the determined target marks are captured by the respective camera. Subsequently, the recorded image of the respective camera 18 is compared with the location information and the deviation of the position of the at least one target mark displayed in the image of the camera from the location information is determined. Accordingly, the computing unit 19 also determines indications and/or control information which indicate in which direction and/or along which angle (absolute value) the camera must be orientated so that the position of the at least one target mark corresponds to the location information.

The corresponding indications and/or control information are then transmitted to an interface, for example an interface for a display screen/monitor 20 (see FIG. 2) and/or a control device. The interface is provided on the computing unit. The reference information is then displayed on the screen 20 connected to the interface, for example by an arrangement of the target marks 23 on an image of the camera 18 corresponding to the reference information. The image of the respective camera 18 recorded by the camera 18 can then also be displayed superimposed on the screen 20, so that the user recognizes the difference between the target arrangement of the target marks 23, which results from the reference information, and the actual arrangement of the target marks in the image of the respective camera 18. In addition, as shown in FIG. 2, an arrow 25 may be displayed, for example, indicating the direction of the orientation of the camera 18 (by the direction of the arrow) and the angle (absolute value) (symbolized by the length of the arrow).

Prior to and after each orientation step, a quality measure (see above for examples) is determined from the sum of the distance squares of the target marks in the image of the real camera and based on the reference information, indicating how well the orientation has already been achieved. For example, in the case of automatic orientation of the cameras 18, the orientation may be cancelled if the quality measure falls below a predefined threshold value.

As an alternative to an orientation by a user, for example a technician, the interface may be connected to a control device, which in turn is connected to the cameras. In this embodiment, each camera has a servomotor that swivels the cameras according to the control information transmitted by the control device to achieve an ideal orientation of the cameras. The control information for the cameras is calculated by the control device based on the reference information for the respective camera and the image of the real object captured by the camera. This may, for example, be carried out using iterative methods. The control device may also calculate a quality measure for the orientation of each camera in the manner described above and output it on a corresponding display device connected to the control device or transmit it back to the computing unit for further processing.

After the cameras have been orientated, they may still be intrinsically and/or extrinsically calibrated as described above. Subsequently, the real object used for orientation and/or other real objects corresponding to the respective CAD model may be measured. If a new object with a different shape is to be measured, the procedure described above may need to be repeated, including the mounting of the cameras and the mounting and orientation of the projectors as well as the calibration of the cameras with a new CAD model and other target marks, before the new object may be measured.

The method described makes it quick and easy to prepare for measuring three-dimensional objects using a large number of cameras.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for establishing an orientation of a predetermined number of real cameras for measuring of a real three-dimensional object using the real cameras and a pattern in a predetermined coordinate system, wherein for the measuring the pattern is projected onto a surface of the real object with at least one projector and said pattern is recorded, at least sectionwise, with each real camera of the predetermined number, wherein a three-dimensional virtual model of an ideal object corresponding to the real object exists, the method comprising the following steps:

a) orientating the at least one projector on the surface of the real object in such a way that a position of the pattern corresponds to a predetermined position of the pattern on the virtual model, b) defining or providing a plurality of target marks on the surface of the ideal object in the three-dimensional virtual model, c) automatically determining reference information for each camera, wherein the reference information includes identification information containing the information which at least one of target marks the respective camera captures when the respective camera and the at least one projector of the pattern are arranged and oriented in a predetermined manner, and the reference information also includes location information associated with the respective camera and the at least one target mark, which contains the information where in a captured image of a field of view of the respective camera said at least one target mark appears when the respective camera and the at least one projector of the pattern are arranged and oriented in the predetermined manner, wherein the automatically determining reference information for each camera is carried out based on the three-dimensional virtual model of the ideal object and corresponding virtual representations of the cameras and the pattern, and d) recording an image of the surface of a real object with a real camera, automatically calculating indications, or control information, or both for finding a specified target mark in the image of the respective real camera and for orienting the respective real camera with an aid of the real object based on the determined reference information for the respective camera, and providing the indications, or control information, or both to the respective camera at a predetermined interface, wherein step d) is carried out for each camera of the predetermined number of cameras.

2. The method according to claim 1, wherein, using a real pattern projected onto the surface of the real object, the at least one target mark on the surface of the real object is searched for in the image of the respective camera using each real camera and the real object, and then the indications, or control information, or both for finding the at least one target mark are calculated.

3. The method according to claim 1, wherein the indications, or control information, or both for orienting the respective real camera are determined by comparing the identification information and the at least one target mark visible in the image of the respective real camera, or by comparing the determined location information of the at least one target mark for the respective camera with the position of the at least one target mark in the image of the respective real camera, or by both.

4. The method according to claim 1, wherein a quality measure for a deviation of the current orientation of the respective real camera from the reference information derived for the respective camera is determined and made available as an indication, or control information, or both at the predetermined interface.

5. The method according to claim 1, wherein data of the three-dimensional virtual model of the ideal object is CAD data, or wherein the pattern is a two-dimensionally coded pattern, or both.

6. The method according to claim 1, wherein the interface is connected to a display, or to a loudspeaker, or to a control device for a plurality of motors, or any combination thereof, wherein the indications, or control information, or both are processed by the display, or by the loudspeaker, or by the control device, or outputted on the display, or by the loudspeaker, or transmitted by the control device to the motors in such a way that the real cameras are automatically oriented in accordance with the determined reference information of the real cameras.

7. A non-transitory computer readable medium comprising a computer program comprising instructions configured to perform the method of claim 1 when the computer program is executed on a computer.

8. A device for providing an orientation of a predetermined number of real cameras for measuring a real three-dimensional object using the real cameras and a pattern in a predetermined coordinate system, wherein for a measurement the pattern is configured to be projected onto a surface of the real three-dimensional object with at least one projector and configured to be recorded, at least sectionwise, with each real camera, wherein a three-dimensional virtual model of an ideal object corresponding to the real object exists, wherein A) the at least one projector is configured to be aligned on the surface of the real object in such a way that a position of the pattern corresponds to a predetermined position of the pattern on the virtual model, wherein the device comprises a computing unit configured to:

B) define or provide a plurality of target marks on the surface of the ideal object in the three-dimensional virtual model, C) automatically determining reference information for each camera, wherein the reference information comprises identification information that includes information as to which at least one target mark of the plurality of target marks the respective camera captures when the respective camera and the projector of the pattern are arranged and oriented in a predetermined manner, and the reference information also comprises location information associated with the respective camera and target mark, which includes the information where in a captured image of a field of view of the respective camera the at least one target mark appears when the respective camera and the at least one projector of the pattern are arranged and oriented in the predetermined manner, wherein the reference information for each camera is determined based on the three-dimensional virtual model of the ideal object and corresponding virtual representations of the cameras and the pattern, and D) recording an image of the surface of a real object with a real camera, automatically determining indications, or control information, or both for finding a specified target mark in the image of the respective real camera and for orienting the respective real camera with a real object based on the determined reference information for the respective camera and automatically providing the indications, or control information, or both at a predetermined interface, wherein the computing unit is configured to perform step D) for each camera of the predetermined number of cameras.

9. The device according to claim 8, wherein the computing unit is configured to search with each real camera and the real object, using a real pattern projected onto the surface of the real object, for the at least one target mark on the surface of the real object in accordance with the identification information in the image of the respective camera and subsequently to calculate the indications, or control information, or both for finding the at least one target mark.

10. The device according to claim 8, wherein the computing unit is further configured to determine indications, or control information, or both for orienting the respective real camera by comparing the identification information and at least one target mark visible in the image of the respective real camera, or by comparing the determined location information of the at least one target mark for the respective camera with the position of the at least one target mark in the image of the respective real camera, or by both.

11. The device according to claim 8, wherein the computing unit is further configured to determine a quality measure for a deviation of the current orientation of the respective real camera from the reference information determined for the respective camera and to make the quality measure available as an indication, or control information, or both at the predetermined interface.

12. The device according to claim 8, wherein a data of the three-dimensional virtual model of the ideal object is CAD data, or wherein the pattern is a two-dimensionally coded pattern, or both.

13. The device according to claim 8, wherein the device further comprises at least one auxiliary camera.

14. The device according to claim 8, wherein the interface is connectable to a display, or to a loudspeaker, or to a control device for a plurality of motors, or a combination thereof, wherein the indications, or control information, or both are transmitted to the display, or to the loudspeaker, or to the control device, or to a combination thereof.

15. A system comprising:

the device according to claim 8, and a display, or a loudspeaker, or a control device for a plurality of motors, or a combination thereof, wherein an interface is connected to the display, or to the loudspeaker, or to the control device, or to a combination thereof, and wherein the indications, or control information, or both provided at the interface are configured to be transmitted to the display, or to the loudspeaker, or to the control device, or to a combination thereof, wherein the indications, or control information, or both are processed by the display, or by the loudspeaker, or by the control device, or by a combination thereof, wherein the indications are output on the display, or on the loudspeaker, or the control information is transmitted by the control device to the motors, or a combination thereof in such a way that the real cameras are automatically oriented in accordance with the determined reference information of the real cameras.

* * * * *